US009573279B2

(12) United States Patent
Kobori

(10) Patent No.: US 9,573,279 B2
(45) Date of Patent: Feb. 21, 2017

(54) CLAMP APPARATUS FOR INDUSTRIAL ROBOT

(71) Applicant: Sony Corporation, Tokyo (JP)

(72) Inventor: Yuji Kobori, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/893,111

(22) PCT Filed: Mar. 3, 2015

(86) PCT No.: PCT/JP2015/001113
§ 371 (c)(1),
(2) Date: Nov. 23, 2015

(87) PCT Pub. No.: WO2015/151402
PCT Pub. Date: Oct. 8, 2015

(65) Prior Publication Data
US 2016/0101527 A1    Apr. 14, 2016

(30) Foreign Application Priority Data
Mar. 31, 2014  (JP) .................................. 2014-074153

(51) Int. Cl.
*B25J 15/10*    (2006.01)
*B25J 15/00*    (2006.01)
(Continued)

(52) U.S. Cl.
CPC ........... *B25J 15/0028* (2013.01); *B25J 9/0009* (2013.01); *B25J 9/0096* (2013.01);
(Continued)

(58) Field of Classification Search
CPC . B25J 15/0028; B25J 15/0052; B25J 15/0253; B25J 15/0293; B25J 15/106; B25J 9/1612; B25J 9/0009; B25J 9/0096; B25J 15/10; Y10S 901/36; Y10S 901/37; Y10S 901/38
(Continued)

(56) References Cited

U.S. PATENT DOCUMENTS 3,586,176 A * 6/1971 Rackman ................. B25J 9/026
414/792
4,603,896 A * 8/1986 Vasseur .................. B65G 47/90
294/119.1
(Continued)

FOREIGN PATENT DOCUMENTS

DE         3625037    *  1/1988
DE    102008026506 A1   12/2009
(Continued)

*Primary Examiner* — Dean Kramer
(74) *Attorney, Agent, or Firm* — Wolf, Greenfield & Sacks, P.C.

(57) ABSTRACT

A clamp apparatus for an industrial robot includes a base unit, a first clamp unit, and a second clamp unit. The first clamp unit includes first and second claws, first and second driving sources, and first and second linear guides. The first and second driving sources move the first and second claws to the first clamp positions. The first and second linear guides movably support the first and second claws to the base unit. The second clamp unit includes third and fourth claws, third and fourth driving sources, and third and fourth linear guides. The third and fourth driving sources move the third and fourth claws to the second clamp positions. The third and fourth linear guides movably support the third and fourth claws to the base unit.

4 Claims, 14 Drawing Sheets

(51) Int. Cl.
*B25J 9/00* (2006.01)
*B25J 9/16* (2006.01)
*B25J 15/02* (2006.01)

(52) U.S. Cl.
CPC ......... *B25J 9/1612* (2013.01); *B25J 15/0052* (2013.01); *B25J 15/0293* (2013.01); *B25J 15/10* (2013.01); *Y10S 901/36* (2013.01)

(58) Field of Classification Search
USPC ...................................................... 294/119.1
See application file for complete search history.

(56) References Cited

U.S. PATENT DOCUMENTS

| | | | | |
|---|---|---|---|---|
| 4,927,318 A | * | 5/1990 | Hayden | .................. B65G 61/00 206/424 |
| 5,004,401 A | | 4/1991 | Tsubone et al. | |
| 5,127,695 A | * | 7/1992 | Zoeten | ..................... B66C 1/24 294/119.1 |
| 5,163,808 A | | 11/1992 | Tsubone et al. | |
| 6,135,704 A | * | 10/2000 | Seaberg | .................. B66F 9/183 294/119.1 |
| 8,602,474 B2 | * | 12/2013 | Xie | ..................... B25J 15/0052 294/119.1 |

FOREIGN PATENT DOCUMENTS

| | | |
|---|---|---|
| JP | 59-074079 U | 5/1984 |
| JP | 61-050790 A | 3/1986 |
| JP | 61-164791 A | 7/1986 |
| JP | 62-088721 A | 4/1987 |
| JP | 03-095018 A | 4/1991 |
| JP | 05-060785 U | 8/1993 |
| JP | 08-172297 A | 7/1996 |
| JP | 09-295293 A | 11/1997 |
| JP | 2000-108070 A | 4/2000 |
| JP | 2000-271892 A | 10/2000 |

* cited by examiner

CLAMP APPARATUS FOR INDUSTRIAL ROBOT

TECHNICAL FIELD

The present technology relates to a clamp apparatus for holding work pieces, and an industrial robot including the same.

BACKGROUND ART

For example, in a production line of an optical disc apparatus and an electronic device having an angular velocity detecting function, an industrial robot is used in an inspection process for evaluating functionalities of the produced device. Typically, the robot includes a workbench on which devices to be inspected (hereinafter also referred to as work pieces) are mounted, a transfer robot for transferring the work pieces to the workbench, an inspection unit for inspecting the work pieces mounted on the workbench, and the like.

This sort of the transfer robot includes clamp units for holding the work pieces. For example, Japanese Patent Application Laid-open No. 2009-241168 discloses a component holding apparatus including three or more holding claws for holding components, and mutually independent driving sources for driving the holding claws.

Patent Document 1: Japanese Patent Application Laid-open No. 2009-241168

SUMMARY OF INVENTION

Problem to be Solved by the Invention

In order to transfer large-sized and heavy work pieces with high precision, it is necessary that stiffness and strength of the clamp units should be increased to endure a moment load. In this case, if a chucking device for driving the clamp units has high stiffness and high strength, the clamp units become heavy, and a weight capacity of a robot main body is exceeded, thereby undesirably decreasing a transfer accuracy of the work pieces.

In view of the circumstances as described above, an object of the present technology is to provide a clamp apparatus being capable of maintaining a high transfer accuracy even if large-sized and heavy work pieces are transferred, and an industrial robot including the same.

Means for Solving the Problem

A clamp apparatus according to an embodiment of the present technology includes a base unit, a first clamp unit, and a second clamp unit.

The first clamp unit includes first and second claws, first and second driving sources, and first and second linear guides. The first and second claws are faced each other in a first axial direction, and clamps work pieces at first clamp positions in the first axial direction. The first and second driving sources are linked to the first and second claws, respectively, and move the first and second claws to the first clamp positions. The first and second linear guides are disposed at the base unit, and movably support the first and second claws to the base unit.

The second clamp unit includes third and fourth claws, third and fourth driving sources, and third and fourth linear guides. The third and fourth claws are faced each other in a second axial direction orthogonal to the first axial direction, and clamp the work pieces at second clamp positions in the second axial direction. The third and fourth driving sources are linked to the third and fourth claws, respectively, and move the third and fourth claws to the second clamp positions. The third and fourth linear guides are disposed at the base unit, and movably support the third and fourth claws to the base unit.

In the clamp apparatus, the first and second clamp units clamp the work pieces in two axial directions orthogonal each other. At this time, the first to fourth claws are driven by the first to fourth driving sources independently provided, and are supported by the base unit via the first to fourth linear guides. In this manner, the clamp apparatus has high durability to the moment load, and can stably clamp peripheries of the work piece, thereby maintaining high transfer accuracy even if large-sized and heavy work pieces are transferred.

An industrial robot according to an embodiment of the present technology includes a multiarticular arm, and a clamp apparatus mounted to the multiarticular arm.

The clamp apparatus includes a base unit, a first clamp unit, and a second clamp unit.

The first clamp unit includes first and second claws, first and second driving sources, and first and second linear guides. The first and second claws are faced each other in a first axial direction, and clamp work pieces at first clamp positions in the first axial direction. The first and second driving sources are linked to the first and second claws, respectively, and move the first and second claws to the first clamp positions. The first and second linear guides are disposed at the base unit, and movably support the first and second claws to the base unit.

The second clamp unit includes third and fourth claws, third and fourth driving sources, and third and fourth linear guides. The third and fourth claws are faced each other in a second axial direction orthogonal to the first axial direction, and clamp the work pieces at second clamp positions in the second axial direction. The third and fourth driving sources are linked to the third and fourth claws, respectively, and move the third and fourth claws to the second clamp positions. The third and fourth linear guides are disposed at the base unit, and movably support the third and fourth claws to the base unit.

Effect of the Invention

As described above, according to the present technology, a high transfer accuracy can be maintained even if large-sized and heavy work pieces are transferred.

Note that advantages herein described are not necessarily limited, and any advantages described in the present technology may be provided.

MODE(S) FOR CARRYING OUT THE INVENTION

Hereinafter, embodiments of the present technology will be described referring to drawings.

Figure 1:
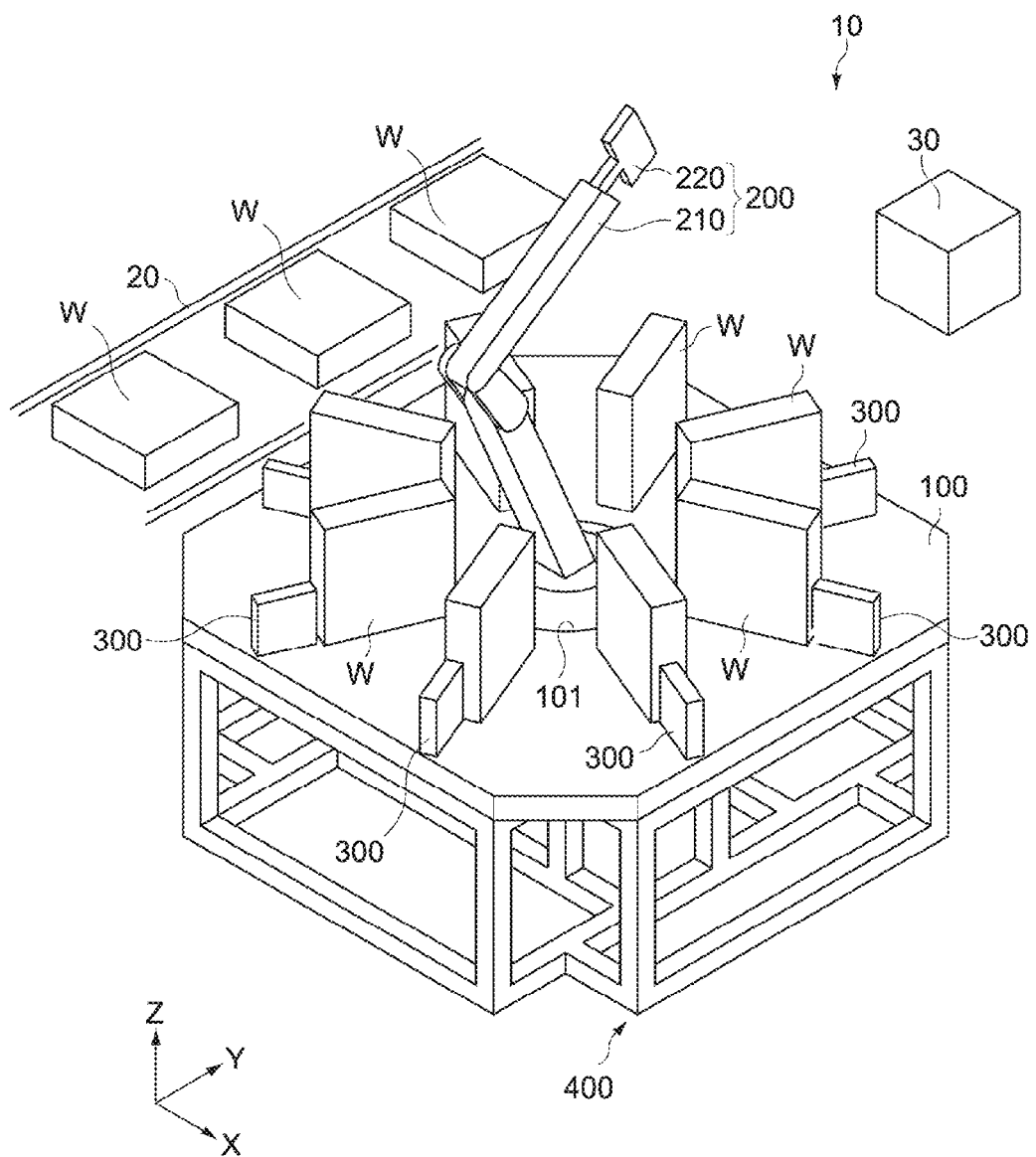
FIG. 1 A schematic perspective diagram of an inspection apparatus as an industrial robot according to an embodiment of the present technology.

FIG. 1 is a schematic perspective diagram of an inspection apparatus 10 as an industrial robot according to an embodiment of the present technology. The inspection apparatus 10 is used for a product inspection process in a production line of electronic devices (hereinafter also referred to as work pieces).

[Overall Configuration of Inspection Apparatus]

The inspection apparatus 10 is placed adjacent to a transfer line 20 of work pieces W. The inspection apparatus 10 includes a working table 100, a robot main body 200, and a plurality of inspection units 300.

At a center of the working table 100, an opening 101 for accommodating the robot main body 200 is provided. A plurality of the inspection units 300 are arranged to surround the opening 101 at equal angular intervals, are electrically connected to the work pieces W mounted on the working table 100, and evaluate predetermined electrical actions of the respective work pieces W. The robot main body 200 transfers the work pieces W one by one between the transfer line 20 and the working table 100. The robot main body 200 sequentially transfers the work pieces W from the transfer line 20 to predetermined positions of the working table 100, and sequentially transfers the inspected work pieces W from the working table 100 to the transfer line 20.

Actions of the robot main body 200 and a plurality of the inspection units 300 are controlled by a controller 30. The controller 30 is typically configured of a computer. The controller 30 may control the robot main body 200 such that transfer positions of the work pieces W are different depending on the evaluation results of the work pieces W by a plurality of the inspection units 300. Also, the controller 30 may be configured to control an action of the transfer line 20 as well as the actions of the robot main body 200 and a plurality of the inspection units 300. In addition, the controller 30 may be configured as a part of the inspection apparatus 10.

As the inspection unit 300, a variety of inspection apparatuses are used depending on types and inspection contents of the work pieces W. For example, when the work pieces W are electronic devices including movable precision components such as optical disc apparatuses, an inspection apparatus for evaluating optical pickup operations is used. When the work pieces W are electronic devices having an image stabilization function such as digital cameras, an inspection apparatus for evaluating an output of a motion sensor such as an angular speed sensor is used.

The types and the shape of the work pieces W are not especially limited. In this embodiment, as the work pieces W, optical disc apparatuses having substantially rectangular parallelepiped shapes in a planar view. The work pieces W are mounted on the transfer line 20 in side lying positions, and are mounted on the working table 100 in standing positions, as shown in FIG. 1. But it is not limited thereto, the positions of the work pieces W may be set depending on the configurations of the transfer apparatus and the inspection apparatus, as appropriate.

The inspection apparatus 10 includes a cradle unit 400 that supports commonly the working table 100 and the robot main body 200. The cradle unit 400 includes a first cradle 41 for supporting the robot main body 200, and a second cradle 42 for supporting the working table 100.

[Cradle Unit]

Figure 2:
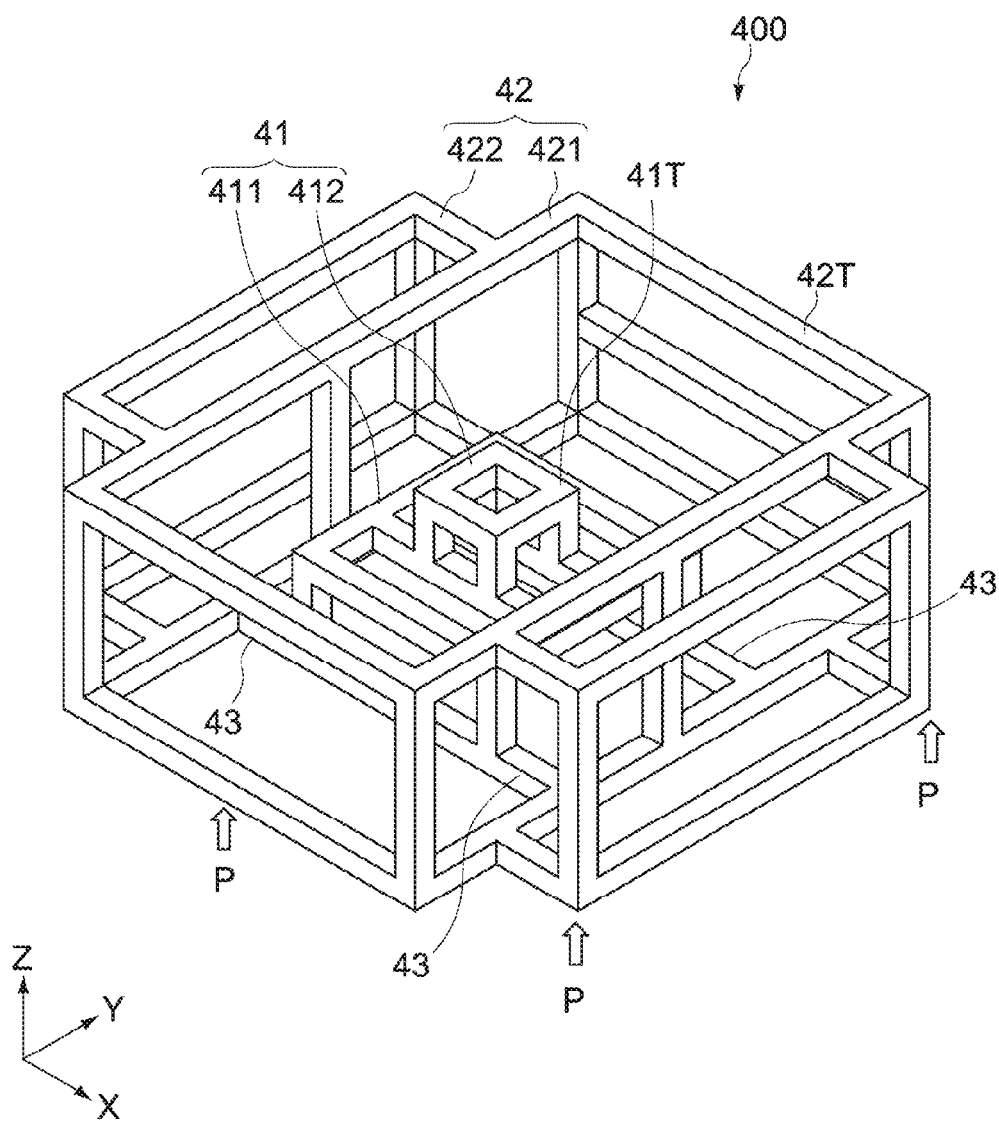
FIG. 2 A schematic perspective diagram showing an entire cradle unit in the inspection apparatus.
Figure 3:
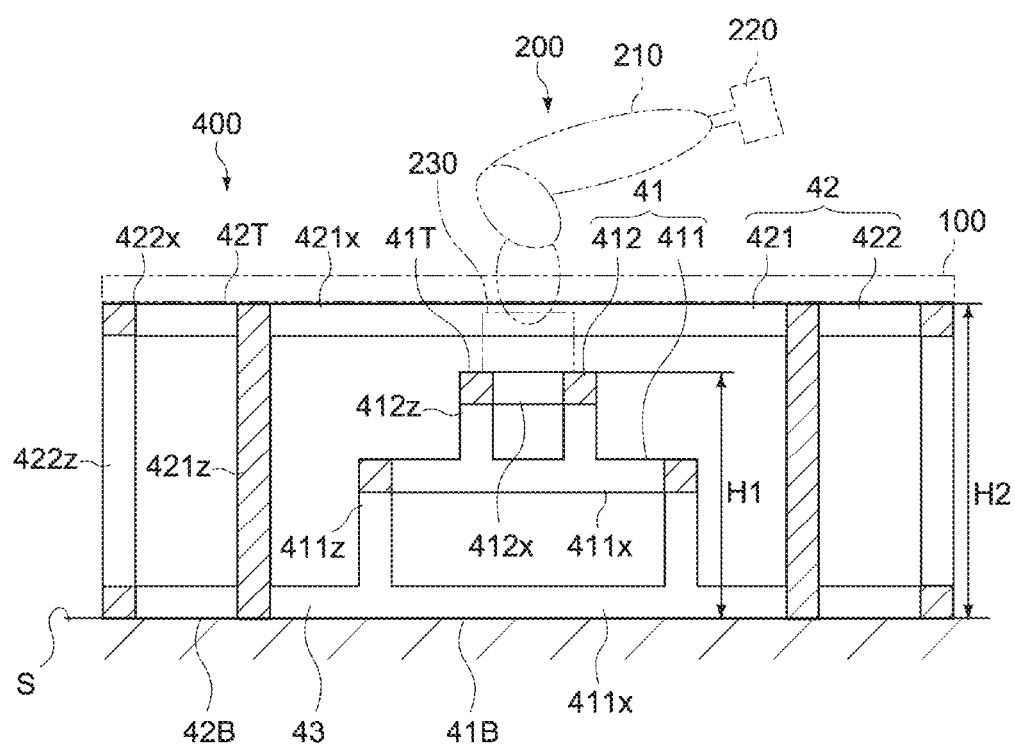
FIG. 3 A cross-sectional diagram viewed from a front face direction of the cradle unit.
Figure 3:
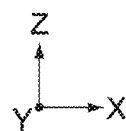
Figure 4:
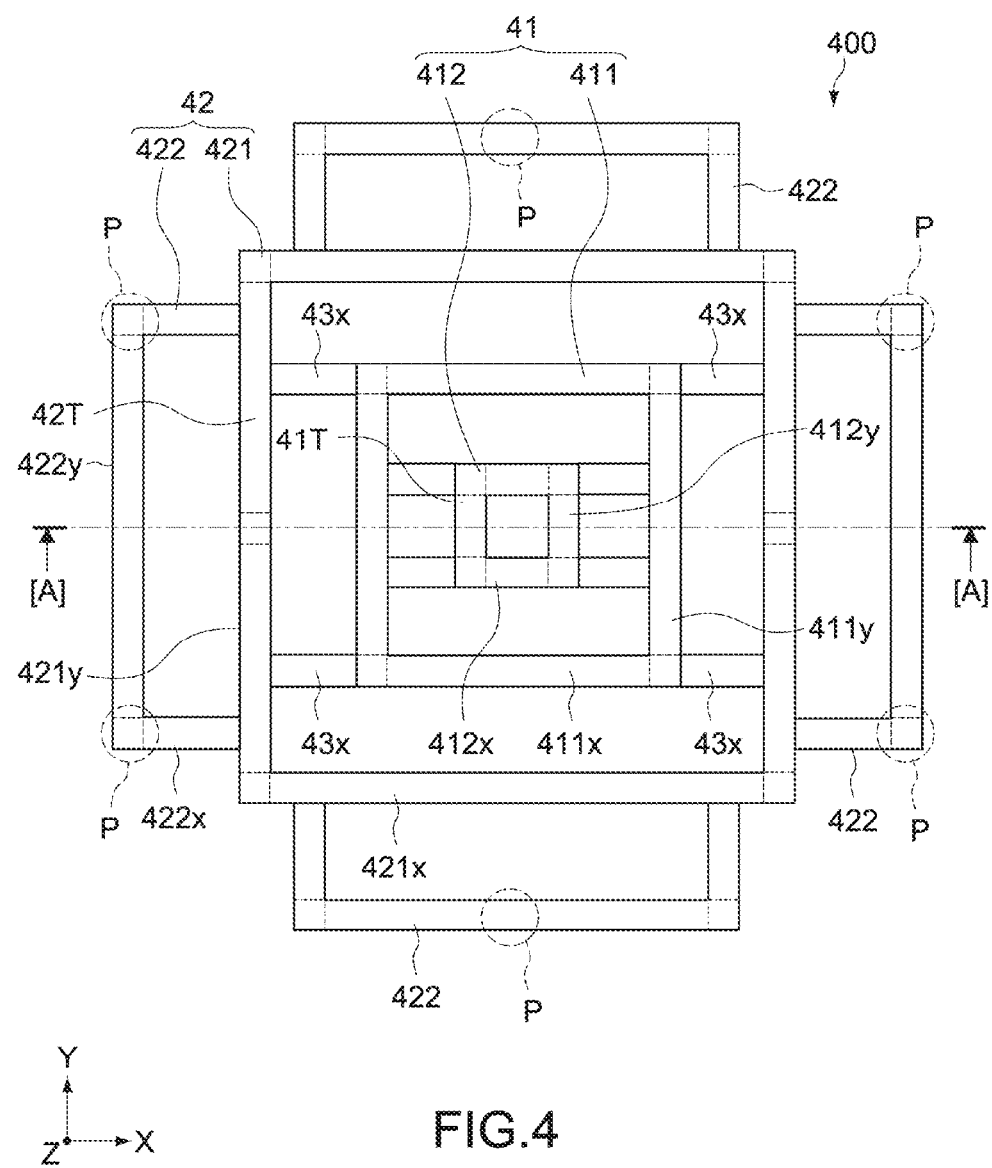
FIG. 4 A plan diagram of the cradle unit.

FIG. 2 is a schematic perspective diagram showing the entire cradle unit 400. FIG. 3 is a cross-sectional diagram viewed from a front face direction of the cradle unit 400 (a cross-sectional diagram along an [A]-[A] line in FIG. 4). FIG. 4 is a plan diagram of the cradle unit 400. In each drawing, X axis and Y axis directions represent a mutually orthogonal horizontal direction, and a Z axis represents a height direction orthogonal to the X axis and Y axis directions.

The cradle unit 400 is configured of a stereoscopic metal frame having a framework structure. A height of the cradle unit 400 is set such that the robot main body 200 can be placed at a predetermined height H1 from a floor S and the working table 100 can be placed at a predetermined height H2 from the floor S (see FIG. 3).

The cradle unit 400 includes a first cradle 41, a second cradle 42, and a linked frame 43.

(First Cradle)

The first cradle 41 is configured of a stereoscopic metal frame. The first cradle 41 includes a first upper end 41T supporting the robot main body 200, and a first bottom 41B installed on the floor S.

The first cradle 41 further includes a combination structure of a first base frame 411 and a second base frame 412.

The first base frame 411 has a framework structure having the first bottom 41B. In other words, the first base frame 411 has a plurality of axial members $411x$ extending to the X axis direction, a plurality of axial members $411y$ extending to the Y axis direction, and a plurality of axial members $411z$ extending to the Z axis direction, and is configured of a stereoscopic frame where a plurality of the axial members are mutually combined. The first bottom 41B is configured of a frame face in parallel with the floor S.

The second base frame 412 has a framework structure including the first upper end 41T. In other words, the second base frame 412 has a plurality of axial members $412x$ extending to the X axis direction, a plurality of axial members $412y$ extending to the Y axis direction, and a plurality of axial members $412z$ extending to the Z axis direction, and is configured of a stereoscopic frame where a plurality of the axial members are mutually combined. The first upper end 41T is configured of a frame face S in parallel with the floor S.

A plurality of the axial members $412x$, $412y$, $412z$ for the second base frame 412 have axis lengths shorter than those of the axial members $411x$, $411y$, $411z$ for the first base frame 411. The second base frame 412 configured in this way is installed on an upper center of the first base frame 411.

The first base frame 411 and the second base frame 412 are coupled or integrated by bolting or welding a plurality of the axial members. The length, the cross-section shape, the thickness of each axial member is not especially limited, and are designed to provide predetermined stiffness and strength such that the robot main body 200 is stably supported.

The robot main body 200 is installed on the upper end 41T of the first cradle 41 such that the robot main body 200 is projected upward from the opening 101 of the working table 100. There is a fixed interspace between the opening 101 and the robot main body 200, and the robot main body 200 operates in non-contact with the working table 100.

In this embodiment, the second base frame 412 is configured detachably to the first base frame 411. In this case, the second base frame 412 is detached from the first base frame 411 together with the robot main body 200. In this way, depending on a type of the robot main body 200, the configuration of the second base frame 412 can be optimized.

(Second Cradle)

The second cradle 42 is configured of a stereoscopic metal frame similar to the first cradle 41. The second cradle 42 includes a second upper end 42T supporting the working table 100, and a second bottom 42B installed on the floor S.

The second cradle 42 further includes a framework structure having the second bottom 42B and a second upper end 42T, and is configured to surround the first cradle 41. The second bottom 42B and the second upper end 42T are configured of frame faces in parallel with the floor S. In this embodiment, the second cradle 42 includes a main body frame unit 421 and a plurality of auxiliary frame units 422.

The main body frame unit 421 has a plurality of axial members 421x extending to the X axis direction, a plurality of axial members 421y extending to the Y axis direction, and a plurality of axial members 421z extending to the Z axis direction, and is configured of a rectangular parallelepiped shaped frame where a plurality of the axial members are mutually combined.

A plurality of the axial members 421x, 421y, 421z for the main frame unit 421 have axis lengths longer than those of the axial members 411x, 411y, 411z for the first base frame 411. In this embodiment, the axial members 421z along the Z axis direction have axis lengths longer than a sum of the axial members 411z of the first base frame 411 and the axial members 412z of the second base frame 412.

A plurality of the auxiliary frame units 422 are installed on four sides of the main frame unit 421. The auxiliary frame units 422 have a plurality of axial members 422x extending to the X axis direction, a plurality of axial members 422y extending to the Y axis direction, and a plurality of axial members 422z extending to the Z axis direction, and is configured of a rectangular parallelepiped shaped frame where a plurality of the axial members are mutually combined.

The upper faces of the respective auxiliary frame units 422 and the main body frame unit 421 are configured to be flush with each other, thereby forming the second upper end 42T. At an appropriate position of the second upper end 42T, a plurality of bolt fastening holes are formed for fixing the working table 100.

On the other hand, the lower faces of the respective auxiliary frame units 422 and the main body frame unit 421 are formed to be flush with each other, thereby forming the second bottom end 42B. The second bottom end 42B is fixed to the floor S via a plurality of anchor bolts (not shown). Fixing positions by the anchor bolts are not especially limited. For example, a cradle unit 400 is fixed to the floor S at a plurality of the fixing positions on the auxiliary frame units 422 shown in symbols P in FIG. 4.

The main body frame unit 421 and the auxiliary frame units 422 are coupled or integrated by bolting or welding a plurality of the axial members. The length, the cross-section shape, the thickness of each axial member is not especially limited, and are designed to provide predetermined stiffness and strength such that the robot main body 200 is stably supported.

(Linked Frame)

A linked frame 43 is configured of a plurality of axial members that link the first bottom 41B and the second bottom 42B each other. The first bottom 41B and the second bottom 42B are formed on the same plane. The linked frame 43 is configured of a plurality of axial members in parallel with the plane. In this embodiment, the linked frame 43 may be configured of a plurality of axial members 43x extending to the X axis direction. Alternatively or in addition, the linked frame 43 may be configured of a plurality of axial members 43x extending to the Y axis direction.

A plurality of axial members 43x configuring the linked frame 43 may be configured of independent axial members, or may be configured of a common axial member configuring the first cradle 41 or the second cradle 42. In this embodiment, the axial members 43x are configured of common axial members of the axial members 41x configuring the first bottom 41B, and are integrally bonded by bolting or welding to the axial members 421y of the main body frame unit 421 configuring the second bottom 42B.

As the linked frame 43 is disposed between the first bottom 41B and the second bottom 42B, a plurality of axial members configuring the first and second cradle 41, 42 are present between the first upper end 41T and the second upper end 42T. In this manner, a vibration transmission path can be prolonged maximally from the first upper end 41T supporting the robot main body 200 to the second upper end 42T supporting the working table 100. Accordingly, vibration generated accompanied by turning and extending the robot main body 200 becomes less transmitted to the working table 100 on which the work pieces W and the inspection unit 300 are mounted, thereby evaluating functionalities of the work pieces W stably and appropriately.

In particular, in this embodiment, the first cradle 41 has a combined structure of the first and second base frames 411 and 412, and the second base frame 412 is configured to have a width narrower than the first base frame 411. Accordingly, a distance from the first upper end 41T, i.e., the vibrating face, to the linked frame 43 is prolonged for the axial members 411x and 411y therethrough. In this manner, a vibration transmission to the working table 100 can be further prevented, while stiffness and strength of the first cradle 41 are increased.

Figure 5:
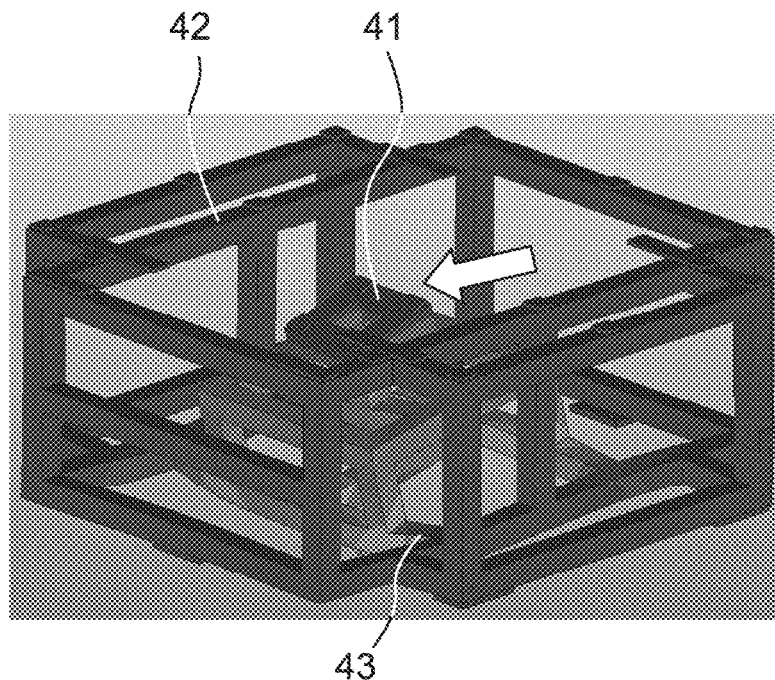
FIG. 5 A simulation result showing a deformation of a vibrating face of the cradle unit when a static load is applied.
Figure 6:
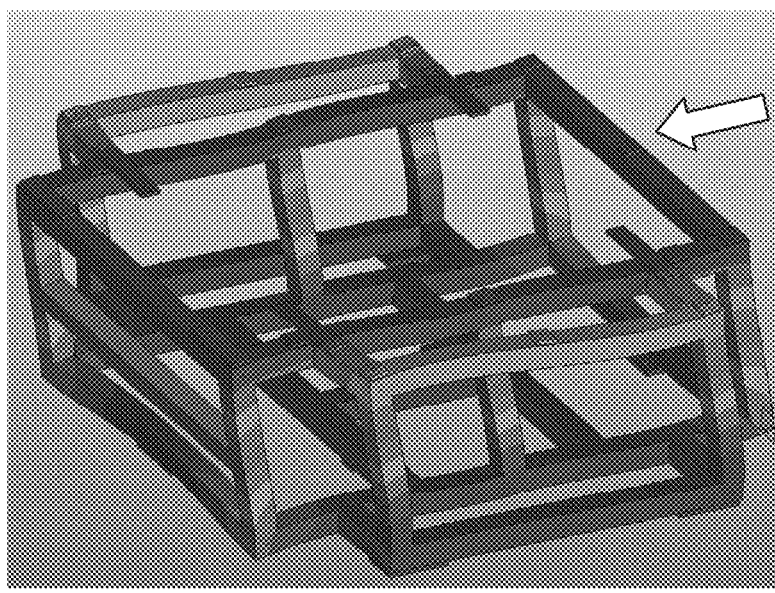
FIG. 6 A simulation result showing a deformation of a vibrating face of a cradle unit in a comparative embodiment when a static load is applied.

FIG. 5 and FIG. 6 are simulation results showing deformations when a static load having a predetermined magnitude is applied to two cradle units having different configurations in the directions shown in white arrows.

FIG. 5 is a simulation result corresponding to the cradle unit according to this embodiment, and shows that a static load is applied to the upper end of the first cradle 41 from a horizontal direction. As shown in FIG. 5, although the first cradle 41, the linked frame 43, and the bottom of the second cradle 42 are deformed, the upper end of the second cradle 42 is not deformed.

On the other hand, FIG. 6 is a simulation result corresponding to the cradle structure according to a comparative embodiment. In the comparative embodiment, there is a cradle structure where work pieces, an inspection apparatus and a transfer robot are installed on a common table. Assuming that the cradle is the same as the second cradle, deformation was measured when a static load is applied to the upper end from a horizontal direction. As a result, as shown in FIG. 6, the whole cradle is deformed, and the upper end supporting the table were significantly deformed. In view of this, superiority of this embodiment is easily conceived.

In addition, according to this embodiment, the bottom 42 of the second cradle 42 is fixed to the floor S by a plurality of anchor bolts. Accordingly, in a fixed position between the second cradle 42 and the floor S, an edge cutting effect of the vibration transmission path can be generated. In particular, the fixing position is set by the anchor bolts directly under the axial members (supporting posts) extending to the Z axis direction in the first and second cradles 41 and 42, the above-described advantages can be noticeable. Also, by setting the fixing position by the anchor bolts to the linked frame 43, the above-described advantages can be provided.

As described above, the cradle unit 400 according to this embodiment can evaluate the functionalities adequately, even when the work pieces W are transferred by the robot main body 200, thereby shortening a cycle time for one inspection apparatus. Also, the number of the inspection apparatuses for providing desirable tacts can be reduced.

In the cradle unit 400 according to this embodiment, the first cradle 41 and the second cradle 42 are integrated via the linked frame 43. For example, when the apparatus is started up or a line layout is changed, a desirable install accuracy of both cradles 41 and 42 can be assured. In this way, as compared with the case that two cradles are separated, install workability of the cradle unit can be improved.

[Robot Main Body]

Next, the robot main body 200 will be described in detail.

As shown in FIG. 1, the robot main body 200 includes a multiarticular arm 210, a hand unit 220 connected to a tip of the multiarticular arm 210, and a driving unit 230 connected to a base end of the multiarticular arm 210.

The multiarticular arm 210 is configured, for example, of a vertical multiarticular arm, but is not limited thereto, and may be configured of the multiarticular arm having other type such as a horizontal multiarticular type, a SCARA (Selective Compliance Assembly Robot Arm) type, a frog leg type and a parallel link type.

The driving unit 230 is fixed between the robot main body 200 and the second base frame 412 of the first cradle 41, and drives the multiarticular arm 210 and the hand unit 220 based on a control command transmitted from the controller 30. The controller 30 controls an operation such as stretching the multiarticular arm 210, revolution around the Z axis and rotation of the hand unit 220. Typically, the controller 30 executes a program stored on a memory of the controller, and operates the robot main body 200 in a predetermined sequence.

[Clamp Apparatus]

The hand unit 220 is configured of a clamp apparatus that can clamps the work pieces W. Hereinafter, the clamp apparatus configuring the hand unit 220 will be described in detail.

Figure 7:
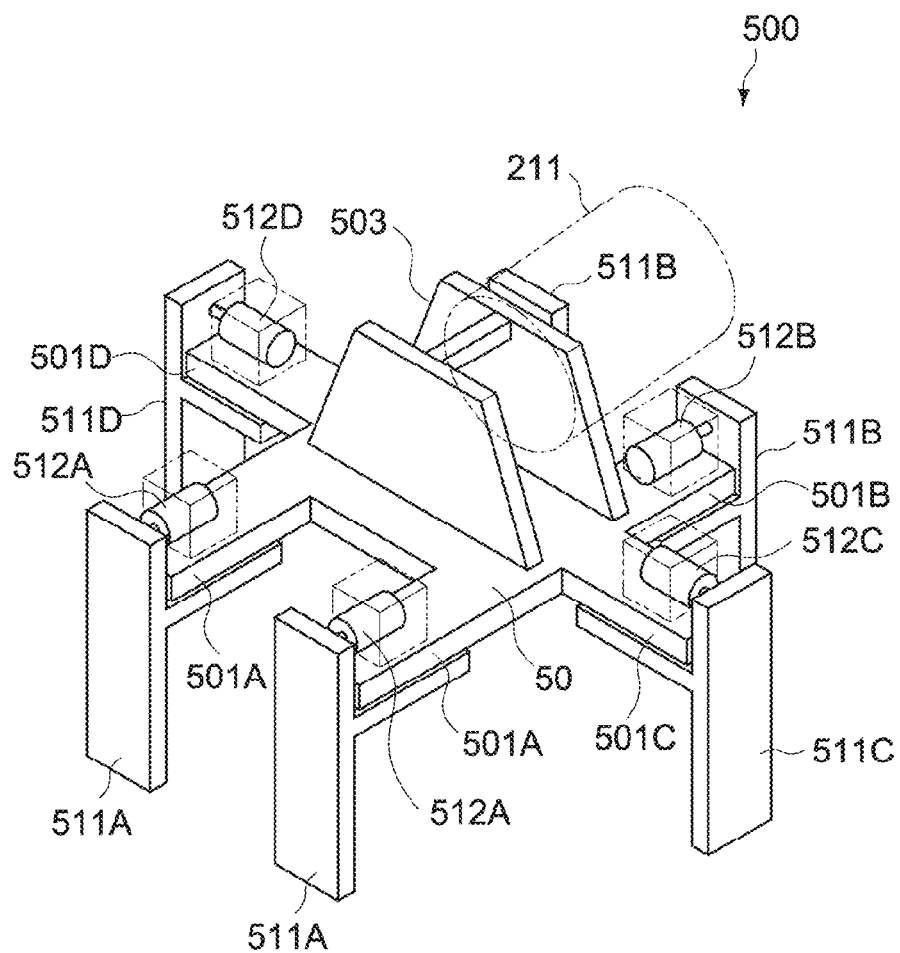
FIG. 7 A perspective diagram showing a schematic configuration of a clamp apparatus included in a robot main body of the inspection apparatus.
Figure 7:
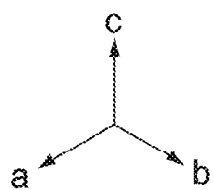
Figure 8:
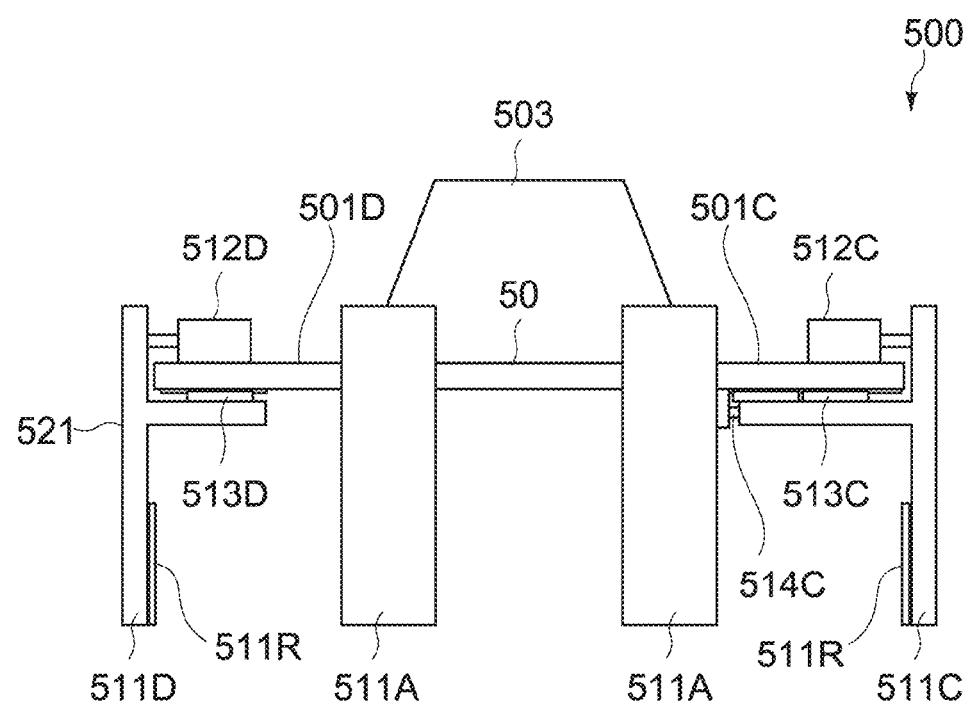
FIG. 8 A front diagram of the clamp apparatus.
Figure 8:
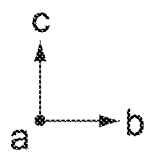
Figure 9:
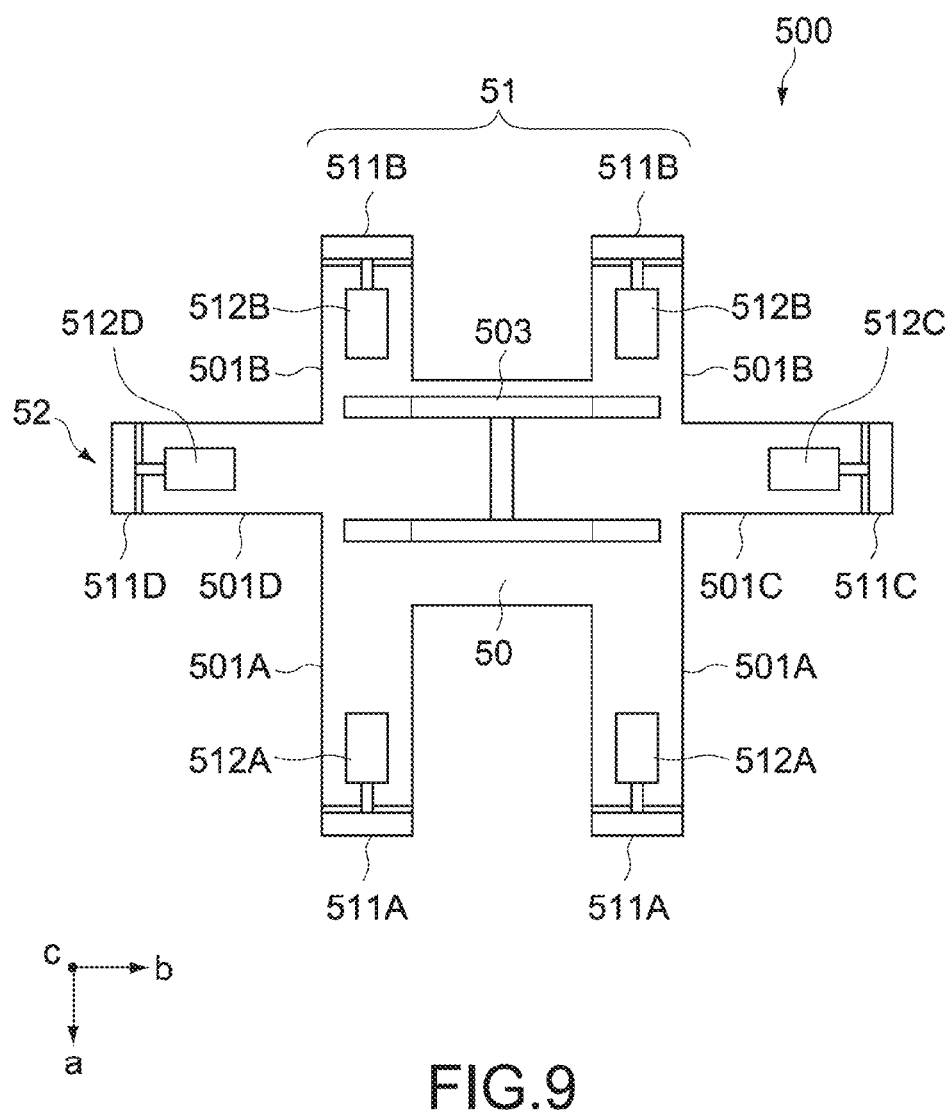
FIG. 9 A plan diagram of the clamp apparatus.
Figure 10:
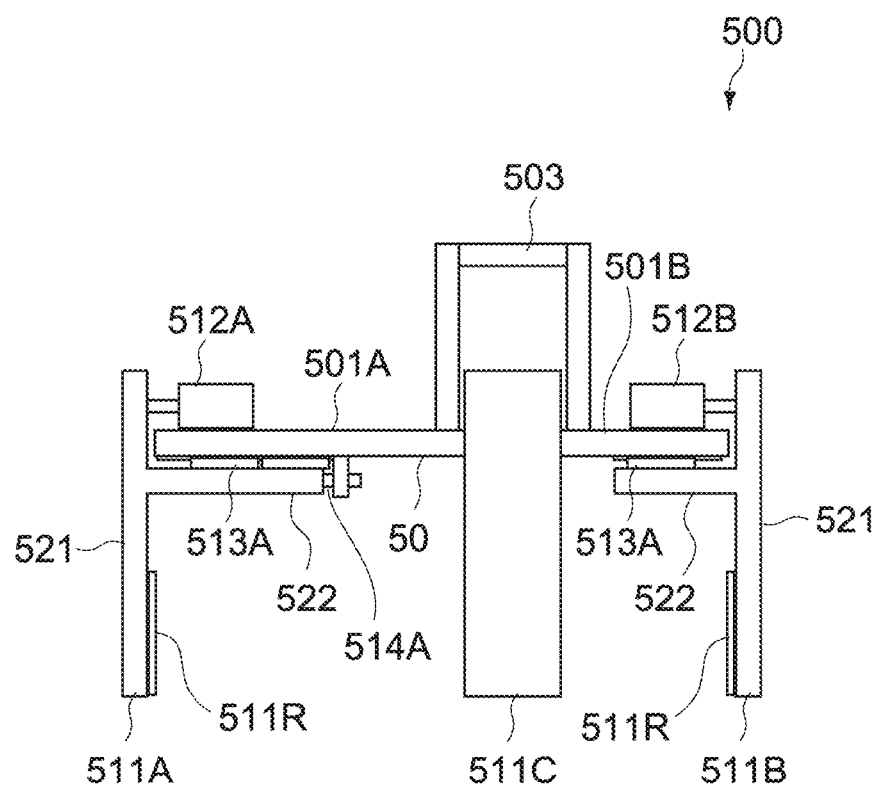
FIG. 10 A side diagram of the clamp apparatus.
Figure 10:
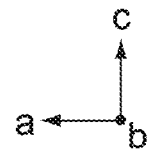
Figure 11:
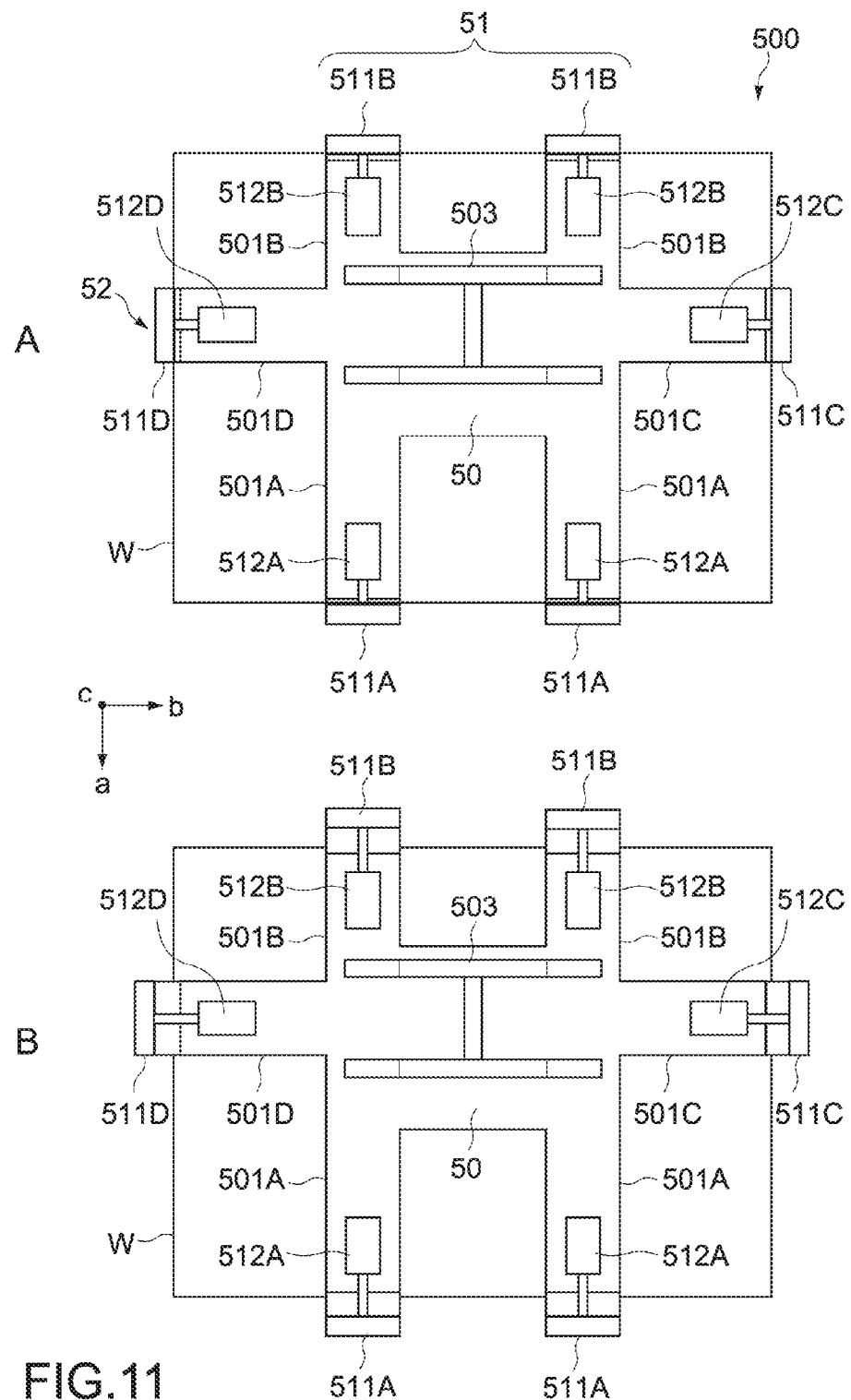
FIG. 11 Plan diagrams for explaining an action of the clamp apparatus.
Figure 12:
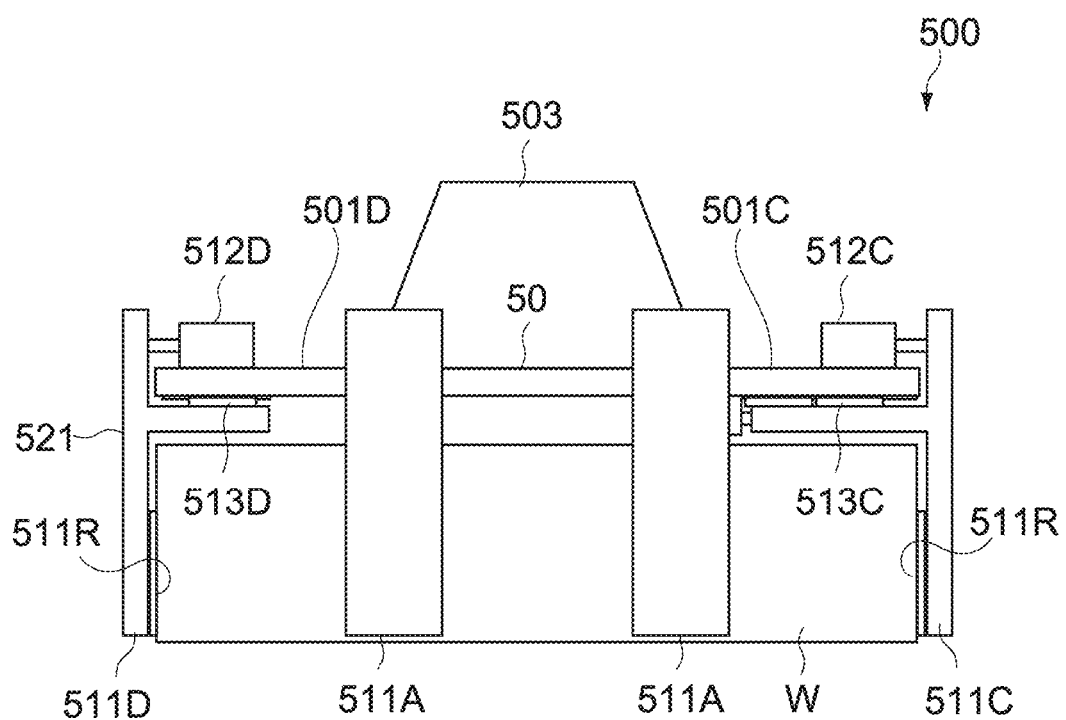
FIG. 12 A front diagram for explaining an action of the clamp apparatus.
Figure 12:
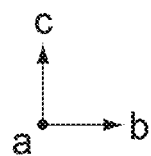

FIG. 7 to FIG. 12 are overall diagrams schematically showing the clamp apparatus 500 configuring the hand unit 220. FIG. 7 is a perspective diagram of the clamp apparatus 500, FIG. 8 is a front diagram of the clamp apparatus 500, FIG. 9 is a plan diagram of the clamp apparatus 500, FIG. 10 is a side diagram of the clamp apparatus 500, FIG. 11 are plan diagrams each for explaining an action of the clamp apparatus 500, and FIG. 12 is a front diagram for explaining an action of the clamp apparatus. In each drawing, an "a" axis, a "b" axis and "c" axis represent three axes directions orthogonal each other. In particular, the "a" axis direction represents a front direction of the clamp apparatus 500.

The clamp apparatus 500 includes a base unit 50, a first clamp unit 51, and a second clamp unit 52.

(Base Unit)

The base unit 50 is configured of a metal material such as an aluminum alloy, and is configured of a plate-like member having a main face in parallel with an ab plane.

The base unit 50 includes a plurality of plate-like protruded pieces 501A, 501B, 501C and 501D that protrude from periphery to the "a" axis direction and the "b" axis direction. The protruded pieces 501A and 501B face to the "a" axis direction, and the protruded pieces 501C and 501D face to the "b" axis direction. Two sets of the protruded pieces 501A and 501B are formed to the "b" axis direction. On the other hand, one set of the protruded pieces 501C and 501D are formed at a position closer to a protruded piece 501B side.

On a main face of the base unit 50, a connection unit 503 connecting to a tip 211 of the multiarticular arm 210 is disposed. The connection unit 503 is connected rotatably around the "a" axis to the tip of the multiarticular arm 210.

(First Clamp Unit)

The first clamp unit 51 includes the claws 511A and 511B (first and second claws), the driving sources 512A and 512B (first and second driving sources), and the linear guides 513A and 513B (first and second linear guides).

The claws 511A and 511B mutually face to the "a" axis direction, and clamp the work pieces W at the first clamp position to the "a" axis direction. The driving sources 512A and 512B are linked to the claws 511A and 511B, respectively, and move the claws 511A and 511B to the first clamp position. The linear guides 513A and 513B are disposed at the base unit 50, and support the claws 511A and 511B movably to the base unit 50.

The claws 511A are attached to the protruded pieces 501A movably to the "a" axis direction. The claws 511B are attached to the protruded pieces 501B movably to the "a" axis direction. In this embodiment, two sets of the claws 511A and 511B are arranged to the "b" axis direction.

The claws 511A and 511B include vertical plates 521 each having a wide direction to the "b" axis direction and a longitudinal direction to a "c" axis direction, and horizontal plates 522 each having a wide direction to the "b" axis direction and a longitudinal direction to the "a" axis direction. At contact areas where work pieces W are in contact with inner sides of the vertical plates 521, protection layers 511R made of elastic, for example, of silicone rubber are disposed, for example. In this way, adhesion between the claws 511A and 511C and the work pieces W can be improved, and the work pieces are prevented from damaging when clamping.

The driving source 512A is fixed to one main face of the protruded piece 501A (an upper face in FIG. 10), and is linked to the vertical plate 521 of the claw 511A via a driving rod stretching to the "a" axis direction. The driving source 512B is fixed to one main face of the protruded piece 501A (an upper face in FIG. 10), and is linked to the vertical plate of the claw 511B via a driving rod stretching to the "a" axis direction. The driving sources 512A and 512B are fixed at ends or near the protruded pieces 501A and 501B. The driving sources 512A and 512B are configured of air cylinders, but may be configured of other actuators such as hydraulic cylinders and electric motors.

The linear guide 513A is installed on the other face of the protruded piece 501A (a lower face in FIG. 10). The linear guide 513B is installed on the other face of the protruded piece 501B (a lower face in FIG. 10). The linear guides 513A and 513B are configured of guide rails installed at protruded pieces 501A and 501B sides extending to the "a" axis direction, and sliders movable along the guide rails and fixed to the horizontal plate 522 of the claws 511A and 511B.

(Second Clamp Unit)

On the other hand, the second clamp unit 52 includes claws 511C and 511D (third and fourth claws), driving sources 512C and 512D (third and fourth driving sources), and linear guides 513C and 513D (third and fourth linear guides).

The claws 511C and 511D are faced each other in the b axial direction, and clamp the work piece W at the second clamp position. The driving sources 512C and 512D are linked to the claws 511C and 511D, and move the claws 511C and 511D to the second clamp position. The linear guides 513C and 513D are disposed at the base unit 50, and movably support the claws 511C, 511D to the base unit 50.

As the details of the claws 511C and 511D, the driving sources 512C and 512D and the linear guides 513C and 513D are the same as the claws 511A and 511B, the driving sources 512A and 512B and the linear guides 513A and 513B described above, the description is omitted here.

[Operation Example of Clamp Apparatus]

The claws 511A and 511B are configured to be capable of moving between a first clamp position (FIG. 11A, FIG. 12) where the work piece W is clamped in the a axial direction and a clamp cancellation position (FIG. 11B) where a clamp action is canceled by the driving sources 512A and 512B. On the other hand, the claws 511C and 511D are configured to be capable of moving between a second clamp position (FIG. 11A, FIG. 12) where the work piece W is clamped in the b axial direction and a clamp cancellation position (FIG. 11B) where the clamp action is canceled.

The clamp operations by the above described first and second clamp units 51 and 52 may be done concurrently or at a different timing. A clamping force in each clamp unit 51, 52 is not especially limited so long as a chucking force is provided to stably clamp and transfer the work piece W.

In this embodiment, the clamp apparatus 500 can stably clamp the work piece W by the clamp action from the two axes directions. Also, a plurality of the claws 511A to 511C are driven by a plurality of driving sources 512A to 512D disposed independently, and are supported by protruded pieces 501A to 501D via the linear guides 513A to 513D. This provides high durability to the moment load acting on the claws 511A to 511D when the work piece W is clamped. According to this embodiment, high transfer accuracy can be maintained even if large-sized and heavy work pieces are transferred.

Figure 13:
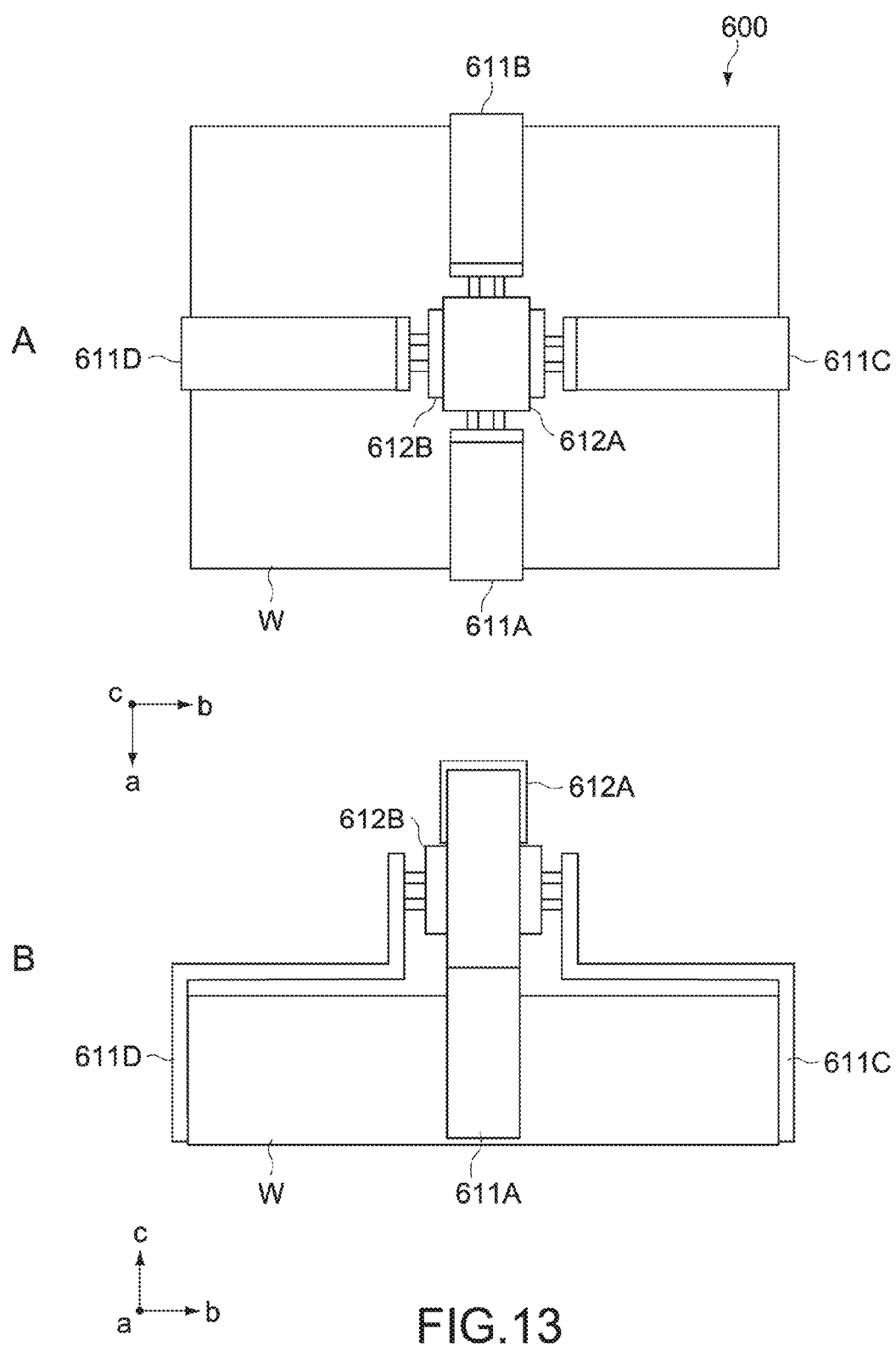
FIG. 13 A plan diagram and a front diagram showing a schematic configuration of a clamp apparatus according to comparative embodiment.

FIGS. 13A and B are a plan diagram and a front diagram showing a schematic configuration of a clamp apparatus 600 according to comparative embodiment.

The clamp apparatus 600 includes a pair of claws 611A and 611B faced in the a axial direction, a pair of claws 611C and 611D faced in the b axial direction, a first driving source 612A for commonly driving a pair of the claws 611A and 611B, and a second driving source 612B for commonly driving a pair of the claws 611C and 611D. The first and second driving sources 612A and 612B are disposed at a center position of the work piece W faced in the c axial direction.

In a clamp apparatus 600 in a comparative embodiment having the above-described embodiment, a distance to a supported point of the work piece W is long in the driving sources 612A and 612B the claws 611A to 611D. Therefore, a great moment load is added to the driving sources 612A and 612B. If the clamp apparatus 600 has low stiffness and strength, it is difficult to increase a speed of the transfer action and to assure a transfer accuracy.

In contrast, in the clamp apparatus 500 in this embodiment, the driving sources 512A to 512D of the claws 511A to 511D are independent, and the respective driving sources 512A to 512D are fixed to ends of the respective protruded pieces 501A to 501D of the base unit. Therefore, a distance between the driving sources 512A to 512D and the claws 511A to 511D can be decreased, thereby decreasing the moment load applied to the respective driving sources 512A to 512D. In this manner, without extremely increasing stiffness and strength of the base unit 50, the speed of the transfer action can be increased, and the predetermined transfer accuracy can be maintained.

(Clamping Method)

Next, a method of clamping the work pieces by the clamp apparatus 500 in this embodiment will be described.

FIGS. 14A and B each is a plan diagram of the clamp apparatus 500 showing a clamp procedure of the work piece W in a side lying position.

The respective claws 511A to 511D of the clamp apparatus 500 are arranged at a predetermined interspace to the periphery of the work piece W on the transfer line 20 by the multiarticular arm 210. Then, the clamp apparatus 500 clamps the work piece W in the procedure shown in FIGS. 14A and B.

Firstly, as shown in FIG. 14A, the clamp apparatus 500 drives the driving sources 512A and 512C, and moves the claws 511A and the claws 511C to the first and second clamp positions, respectively. Next, as shown in FIG. 14B, the clamp apparatus 500 drives the driving sources 512B and 512D, and moves the remaining claws 511B and 511D to the first and second clamp positions, respectively.

Here, in this embodiment, the first and second clamp units 51 and 52 include regulating units 514A and 514C (first and second regulating units) for regulating the respective first clamp positions at one side of the claws 511A and 511C. The regulating unit 514A is installed on the other surface of the protruded piece 501A facing to a tip of the horizontal plate 522 of the claw 511A, as shown in FIG. 10. On the other hand, the regulating units 514C is installed on the other surface of the protruded piece 501C facing to the horizontal plate 522 of the claw 511C, as shown in FIG. 8.

By regulating the first clamp positions of the claws 511A and 511C, the work piece W can be positioned based on the clamp position of the claws 511A and 511C. For example, if the positions of the claws 511A to 511C are varied to the periphery of the work piece W before clamping, two side surfaces W1 and W2 of the work piece W are positioned to the clamp apparatus 500 by the claws 511A and 511B. Even if the claws 511A and 511C are regulated from moving by the regulating units 514A and 514C before in contact with the work piece W, the work piece W moves to the claws 511A and 511C by driving the claws 511B and 511D thereafter, thereby providing a predetermined positioning accuracy.

The driving forces of the driving sources 512A and 512B upon the movement of the claws 511A and 511B to the first clamp position may not only be the same but also be different. Similarly, the driving forces of the driving sources 512C and 512D upon the movement of the claws 511C and 511D to the second clamp position may not only be the same but also be different.

In this embodiment, the driving forces of the driving sources 512A and 512C at one side are set to be greater than those of the driving sources 512B and 512C at the other side. In this manner, the claws 511A and 511C at the other side are configured to be moved to the first and second clamp positions with the driving forces greater than those of the claws 511B and 511D at the other side. A difference between the driving forces (first driving forces) of the driving sources 512A and 512C and the driving forces (second driving forces) of the driving source 512B and 512D is not especially limited. For example, the first driving forces are set to be 1.5 times greater than those of the second driving forces.

By the above-described configuration, the claws 511A and 511C are pressed to the regulating units 514A and 514C with the first driving forces regardless of whether or not the claws 511A and 511C are in contact with the side surfaces W1 and W2 of the work piece W. Under the state, the claws 511B and 511D press other side surfaces of the work piece W with the second driving forces. In this manner, the work piece W is clamped while constantly pressing to the claws 511A and 511C. During the transfer, the predetermined positioning accuracy to the clamp apparatus 500 is assured.

Note that the claws 511A and 511C supporting reference surfaces (W1 and W2) of the work piece W may be designed to have stiffness and strength greater than the other claws 511B and 511D by increasing the number of sliders configuring the linear guides 513A and 513C.

The work piece W clamped as described above is converted to an upright attitude by the multiarticular arm 210 so that the side surface W1 faces down, and is then transferred to the predetermined inspection position of the working table 100. At this time, a recess for housing the claw 511A of the clamp apparatus 500 is formed at the inspection position, thereby cancelling the clamp action after the movement. The inspection unit 300 is electrically connected to the work piece W transferred, and then performs the predetermined inspection operation.

On the other hand, the inspection apparatus 10 transfers the inspected work piece W from the working table 100 to the transfer line 20. Also at this time, by the procedure shown in FIGS. 14A and B, the clamp apparatus 500 clamps the work piece W on the working table 100.

As described above, the embodiments of the present technology have been described. It should be appreciated that the present technology is not limited to the above-described embodiments, and variations and modifications may be made without departing from the scope of the present technology.

For example, in the above-described embodiments, the inspection apparatus for inspecting the electrical operations of the work pieces is illustrated as the industrial robot. Alternatively, it is applicable to other industrial robot including an assembling unit or a welding unit.

Also, in the above-described embodiments, although the robot main body 200 for transferring the work pieces is installed on the first cradle 41, and the inspection unit 300 and the working table 100 for supporting the work pieces W are installed on the second cradle 42, it is not limited thereto. For example, if other apparatuses such as vibrating sources are installed on the first and second cradles, a vibration transfer (cross-talk) is inhibited between the cradles, and it is therefore possible to perform independent and accurate works on the cradles.

In addition, in the above-described embodiments, although the second cradle 42 is arranged to surround the first cradle 41, a layout of the cradles is not especially limited. The number of the cradles is also not limited to two. The present technology is applicable to a variety of cradle structures where three or more cradles are linked via linked frames.

Figure 14:
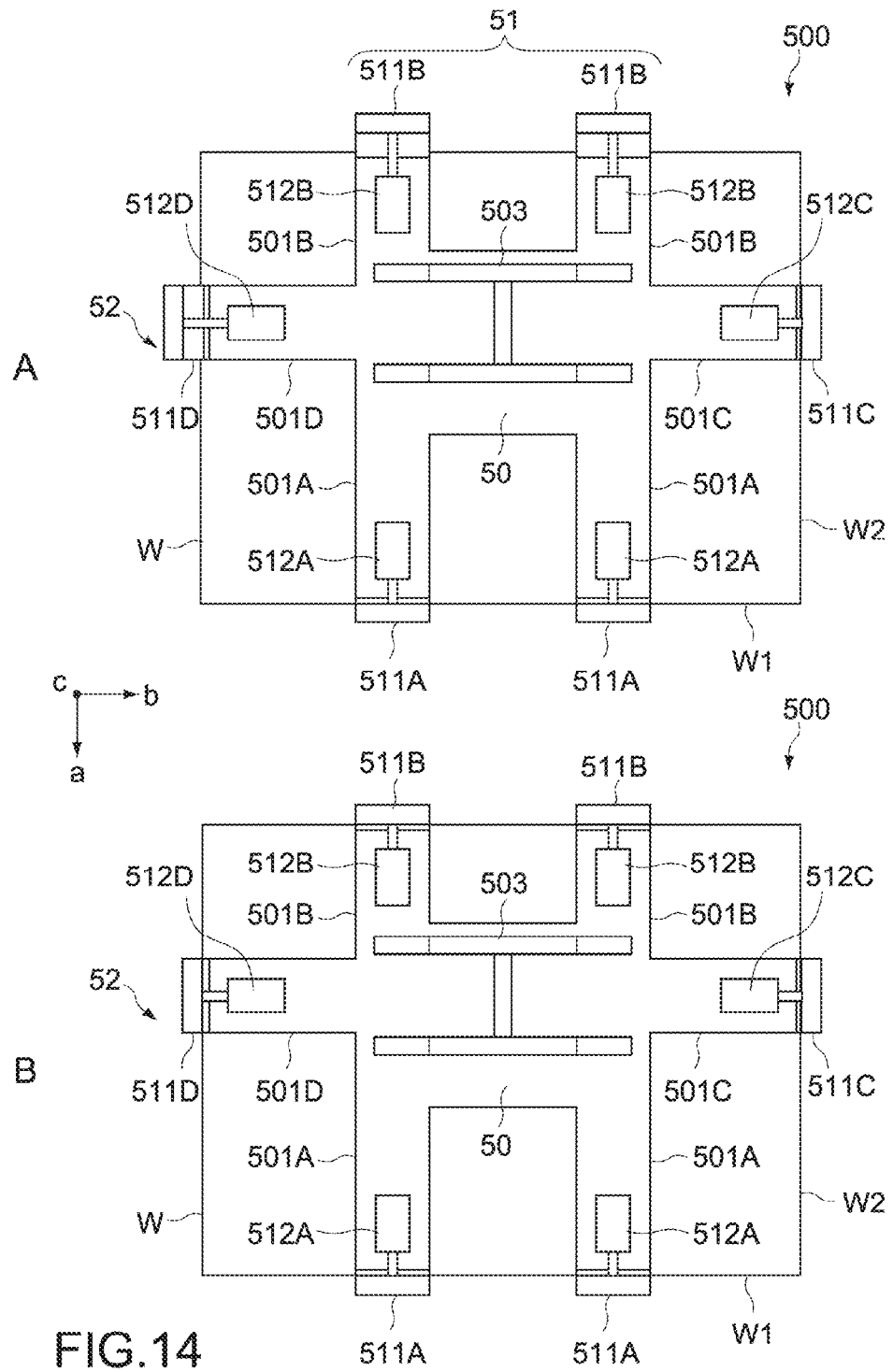
FIG. 14 Plan diagrams of the clamp apparatus showing a clamp procedure of work pieces in side lying positions.
Figure 15:
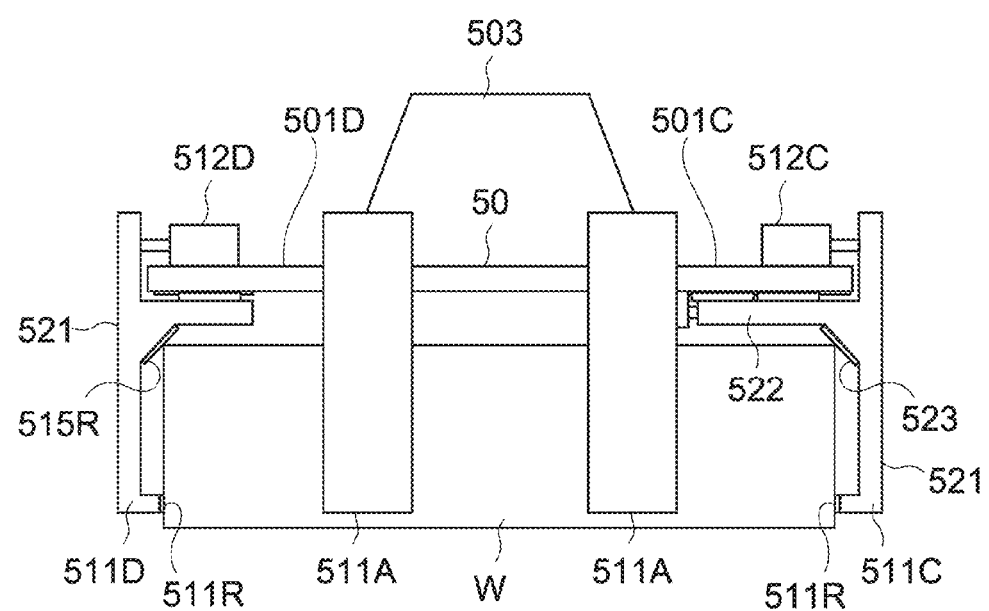
FIG. 15 A front diagram showing an alternative configuration of the clamp apparatus.
Figure 15:
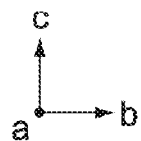

Furthermore, the shapes of the claws 511A to 511C of the clamp apparatus 500 are not limited to the above-described in the embodiments. For example, as shown in FIG. 14, the tips of the claws may be bent to a work piece W side. In this case, a slope 523 may be disposed between the vertical plate 521 and the horizontal plate 522 of the claw, and a protection layer 515R similar to the protection layer 511R may be attached to a surface of the slope 523. This allows a height position of the work piece W to be regulated, thereby improving a clamp position accuracy of the work piece W.

The present technology may have the following configurations.

(1) A clamp apparatus, including:
a base unit;
a first clamp unit having first and second claws faced each other in a first axial direction for clamping a work piece at a first clamp position in the first axial direction, first and second driving sources linked to the first and second claws respectively for moving the first and second claws to the first clamp position, and first and second linear guides disposed at the base unit for movably supporting the first and second claws to the base unit; and
a second clamp unit having third and fourth claws faced each other in a second axial direction orthogonal to the first axial direction for clamping the work piece at second clamp positions in the second axial direction, third and fourth driving sources linked to the third and fourth claws respectively for moving the third and fourth claws to the second clamp position, and third and fourth linear guides disposed at the base unit for movably supporting the third and fourth claws to the base unit.

(2) The clamp apparatus according to (1) above, in which
the first clamp unit has a first regulating unit for regulating a position of the first craw in the first clamp position, and
the second clamp unit has a second regulating unit for regulating a position of the third craw in the second clamp position.

(3) The clamp apparatus according to (2) above, in which
the driving force of the first driving source to the first craw is set to be greater than the driving force of the second driving source to the second craw, and
the driving force of the third driving source to the third craw is set to be greater than the driving force of the fourth driving source to the fourth craw.

(4) The clamp apparatus according to any one of (1) to (3) above, in which
a periphery of the base unit has a plurality of protruded pieces protruding to the first axial direction and the second axial direction, and
the first to fourth craws and the first to fourth linear guides are disposed at a plurality of the protruded pieces.

(5) The clamp apparatus according to any one of (1) to (4) above, in which
the first to fourth craws have protection layers made of an elastic material at a contact position with the work piece.

(6) An industrial robot, including:
a multiarticular arm; and a clamp apparatus mounted to the multiarticular arm,
the clamp apparatus including
a base unit,
a first clamp unit having first and second claws faced each other in a first axial direction for clamping a work piece at a first clamp position in the first axial direction, first and second driving sources linked to the first and second claws respectively for moving the first and second claws to the first clamp position, and first and second linear guides disposed at the base unit for movably supporting the first and second claws to the base unit, and
a second clamp unit having third and fourth claws faced each other in a second axial direction orthogonal to the first axial direction for clamping the work piece at second clamp positions in the second axial direction, third and fourth driving sources linked to the third and fourth claws respectively for moving the third and fourth claws to the second clamp position, and third and fourth linear guides disposed at the base unit for movably supporting the third and fourth claws to the base unit.

DESCRIPTION OF SYMBOLS 10 inspection apparatus
20 transfer line
41 first cradle
42 second cradle
43 linked frame
50 base unit
51 first clamp unit
52 second clamp unit
100 working table
200 robot main body
210 multiarticular arm
300 inspection unit
400 cradle unit
411 first base frame
412 second base frame
500 clamp apparatus
511A to 511D claw
511R, 515R protection layer
512A to 512D driving source
513A to 513D linear guide
514A, 14C regulating unit
W work piece

The invention claimed is:
1. A clamp apparatus, comprising:
a base unit;
a first clamp unit having first and second claws facing each other in a first axial direction for clamping a work piece at a first clamp position in the first axial direction, first and second driving sources linked to the first and second claws respectively for moving the first and second claws to the first clamp position, and first and second linear guides disposed at the base unit for movably supporting the first and second claws to the base unit; and
a second clamp unit having third and fourth claws facing each other in a second axial direction orthogonal to the first axial direction for clamping the work piece at second clamp positions in the second axial direction, third and fourth driving sources linked to the third and fourth claws respectively for moving the third and fourth claws to the second clamp position, and third and fourth linear guides disposed at the base unit for movably supporting the third and fourth claws to the base unit, wherein the base unit includes a plate-like member having first and second protruded pieces protruding from the plate-like member in the first axial direction and third and fourth protruded pieces protruding from the plate-like member in the second axial direction, wherein the first to fourth claws are disposed on the first to fourth protruded pieces, respectively, wherein the first to fourth driving sources are disposed on first surfaces of the first to fourth protruded pieces, respectively, wherein the first to fourth linear guides are disposed on second surfaces of the first to fourth protruded pieces, respectively, and wherein the first surfaces and the second surfaces are opposite surfaces of the first to fourth protruded pieces.

2. The clamp apparatus according to claim 1, wherein
the first clamp unit has a first regulating unit for regulating a position of the first claw in the first clamp position, and
the second clamp unit has a second regulating unit for regulating a position of the third claw in the second clamp position.

3. The clamp apparatus according to claim 2, wherein
the driving force of the first driving source to the first claw is set to be greater than the driving force of the second driving source to the second claw, and
the driving force of the third driving source to the third claw is set to be greater than the driving force of the fourth driving source to the fourth claw.

4. The clamp apparatus according to claim 1, wherein
the first to fourth claws have protection layers made of an elastic material at a contact position with the work piece.

* * * * *